United States Patent Office 2,804,458
Patented Aug. 27, 1957

2,804,458
N²,N⁴-DIPHTHALIDYLMELAMINE

Donald D. Wheeler and David C. Young, Midland, Mich., assignors to The Dow Chemical Company, Midland, Mich., a corporation of Delaware No Drawing. Application July 5, 1956,
Serial No. 595,851

1 Claim. (Cl. 260—249.6)

This invention is directed to $N^2$, $N^4$-diphthalidylmelamine having the structure

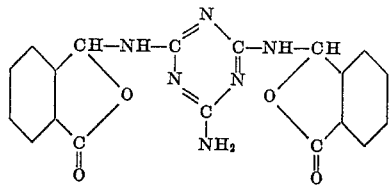

This new compound is a white solid somewhat soluble in organic solvents such as acetone and ethanol and substantially insoluble in water. The compound is useful as a parasiticide and is adapted to be employed for the control of bacteria, nematodes and insects.

The above compound is conveniently prepared by causing phthalaldehydic acid to react with melamine. The terms "phthalaldehydic acid" and "3-hydroxyphthalide" refer to a compound having the structure

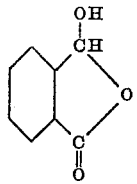

Phthalaldehydic acid is often represented in the literature as having the structure

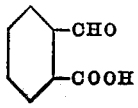

However, the acid employed in this invention and prepared as hereinafter described exists almost entirely in the 3-hydroxyphthalide ring structure, as indicated by its infrared absorption spectrum. Infrared data also indicate the phthalide product to have the ring structure.

The reaction may be carried out in an inert solvent and takes place readily in the temperature range of from 20° to 150° C. Suitable solvents include acetone, benzene, butanone, water and alcohol.

In carrying out the reaction, phthalaldehydic acid and melamine are mixed together in a solvent and heated for a period of from 1 to 4 hours. The mixture is then allowed to cool whereupon a solid product precipitates. The latter is separated from the mixture by filtration and washed successively with water and acetone to obtain the desired diphthalidyl product.

In a representative example, 12.6 grams (0.1 mole) of melamine, 45.0 grams (0.3 mole) of phthalaldehydic acid and 150 milliliters of water were mixed together and heated on the steam bath. At the end of the heating period the mixture was allowed to cool whereupon solids precipitated. They were separated from the reaction mixture by filtration and then washed successively and repeatedly with water and acetone to obtain a $N^2,N^4$-diphthalidylmelamine product melting at 288°–291° C. This amounts to a yield of 27 grams or 70 percent of theoretical.

This compound is useful as toxic constituents in preparations employed for the control of insects, bacteria and nematodes. For example, commercial control of American cock-roaches (*Periplaneta americana*) are obtained when contacted with compositions containing 4 pounds of $N^2,N^4$-diphthalidylmelamine per 100 gallons of dispersion.

The phthalaldehydic acid employed in this invention may be prepared by first photochlorinating o-xylene to obtain $\alpha,\alpha,\alpha,\alpha',\alpha'$-pentachloro-o-xylene by passing chlorine gas into o-xylene while illuminating with sun lamps. The resulting chlorinated o-xylene may be heated with an aqueous constant boiling hydrochloric acid and ferric chloride solution to obtain phthalaldehydic acid as more fully disclosed in U. S. Patent 2,748,162.

We claim:
$N^2,N^4$-diphthalidylmelamine.

No references cited.